United States Patent
James et al.

(10) Patent No.: US 6,203,705 B1
(45) Date of Patent: *Mar. 20, 2001

(54) PROCESS FOR TREATING WASTE WATER CONTAINING COPPER

(75) Inventors: Dustin Kimbel James, Sugar Land, TX (US); Deon Eugene Campbell, Vancouver, WA (US); Thuy Nguyen, Houston, TX (US)

(73) Assignee: Koch Microelectronic Service Company, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/426,116

(22) Filed: Oct. 22, 1999

(51) Int. Cl.[7] .............................. B01D 61/00; B01D 15/04

(52) U.S. Cl. .......................... 210/638; 210/651; 210/639; 210/688; 210/690; 210/691; 210/650; 210/805

(58) Field of Search ..................................... 210/638, 639, 210/660, 690, 693, 681, 688, 691, 650, 651, 723, 724, 725, 195.1, 195.2, 257.2, 767, 805

(56) References Cited

U.S. PATENT DOCUMENTS

| | | |
|---|---|---|
| 1,324,118 | 12/1919 | Hottinger et al. . |
| 3,075,645 | 1/1963 | Riddick . |
| 3,097,163 | 7/1963 | Riddick . |

(List continued on next page.)

FOREIGN PATENT DOCUMENTS

WO 97/47380   12/1997   (WO) .

OTHER PUBLICATIONS

Aspila, K., et al., "Studies on the Stability of Dithiocarbamic Acids," Chemistry Department, Carleton University, Ontairo, Canada, *Talanta*, 1969, vol. 16, pp. 1099 to 1102.

Cattaneo, Jeffrey f., "Removal Of Copper Ions From Rinse Water Using $TiO_2$ Photocatalysis," *SSA Journal*, vol. 13—Spring 1999, pp. 55–59.

Duyvesteyn, W.P.C., et al., "Ammonia Leaching Process for Escondida Copper Concentrates," pp. C125–C140, reprinted with permission from *Extractive Metallurgy of Copper, Nickel and Cobalt*, vol. I: *Fundamental Aspects*, edited by Reddy R.G. and Weizenbach R. N. (Warrendale, PA: The Minerals, Metals and materials Society, Inc. (TMS), 1993).

Egermeier, John, et al., "Treatment of Wastewater Generated by Copper Metalization and CMP," Proceedings of Watertech '99 Executive Form, Oct. 5–6, 1999, Portland, Oregon.

(List continued on next page.)

*Primary Examiner*—Ana Fortuna
(74) *Attorney, Agent, or Firm*—Shook, Hardy & Bacon LLP

(57) ABSTRACT

A process for treating waste water containing copper and other particles from a chemical mechanical planarization (CMP) process is provided. This process includes adjusting the pH of the waste water to between about 3 and 4, adding a coagulant or flocculating polymer to the waste water to generate larger particles, filtering the waste water through a filtration unit to produce a permeate and solids, feeding the permeate through a carbon bed to remove total organic carbon, and feeding the carbon bed treated permeate through an ion exchange column to remove copper from the permeate. This process may further involve washing sludge collected in a concentration tank with the treated stream exiting the ion exchange column. Still further, another aspect of the present invention is a system for performing the process described above.

5 Claims, 1 Drawing Sheet

U.S. PATENT DOCUMENTS

| | | |
|---|---|---|
| 3,101,317 | 8/1963 | Starry . |
| 3,521,752 | 7/1970 | Lindman . |
| 3,544,476 | 12/1970 | Aiba et al. . |
| 4,016,075 | 4/1977 | Wilkins . |
| 4,165,264 | 8/1979 | Satchell, Jr. . |
| 4,188,291 | 2/1980 | Anderson . |
| 4,207,183 | 6/1980 | Herrigel . |
| 4,246,102 | 1/1981 | Hjelmener et al. . |
| 4,260,493 | 4/1981 | Kretas et al. . |
| 4,276,180 | 6/1981 | Matson . |
| 4,357,220 * | 11/1982 | Eisenmann ................. 210/651 |
| 4,420,401 | 12/1983 | Kretas et al. . |
| 4,450,057 | 5/1984 | Kelly . |
| 4,504,356 | 3/1985 | Mulder et al. . |
| 4,655,928 * | 4/1987 | Milton et al. ................. 210/651 |
| 4,731,187 * | 3/1988 | Moriya et al. ................. 210/719 |
| 4,765,913 | 8/1988 | Featherstone . |
| 4,780,211 | 10/1988 | Lien . |
| 4,895,659 * | 1/1990 | Semmens et al. ............ 210/651 |
| 4,938,876 | 7/1990 | Ohsol . |
| 4,957,634 | 9/1990 | Bowers, Jr. . |
| 5,078,900 | 1/1992 | Wegner . |
| 5,108,620 | 4/1992 | Wester et al. . |
| 5,164,095 | 11/1992 | Sparapany et al. . |
| 5,171,453 | 12/1992 | Communal . |
| 5,182,023 | 1/1993 | O'Connor et al. . |
| 5,205,939 | 4/1993 | Syrinek . |
| 5,246,686 | 9/1993 | Cuer et al. . |
| 5,453,206 | 9/1995 | Browne . |
| 5,510,040 | 4/1996 | Miller et al. . |
| 5,512,181 | 4/1996 | Matchett . |
| 5,556,545 | 9/1996 | Volchek et al. . |
| 5,575,915 | 11/1996 | Nakamura et al. . |
| 5,605,633 | 2/1997 | Nakamura et al. . |
| 5,609,765 | 3/1997 | Bowman . |
| 5,620,629 | 4/1997 | Salmen et al. . |
| 5,766,478 * | 6/1998 | Smith et al. ................. 210/651 |
| 5,871,648 * | 2/1999 | Allen et al. ................. 210/638 |
| 5,965,027 | 10/1999 | Allen et al. . |

OTHER PUBLICATIONS

Harris, G. B., et al., "The Stability of Arsenic–Bearing Residues," Paper presented at TMS–AIME Symposium, "Arsenic Metallurgy—Fundamentals and Application," Phoenix, Arizona Jan. 25–29, 1988.

Hulanicki, A., et al., "Complexation Reactions of Dithiocarbamates," Department of Inorganic Chemistry, University of Warsaw, Poland, *Talanta Review*, 1967, vol. 14, pp. 1371 to 1392.

Janssen, M. J., "The Stability Constants of Metal Complexes of Some N–Dialkyldithiocarbamic Acids," Institute for Organic Chemistry T.N.O, Utrecht, the Netherlands), 75 (1956) *RECUEIL* 1411.

Janssen, M. J., "The Stability Constants of Metal Complexes of Some N–Dialkyldithiocarbamic Acids," Institute for Organic Chemistry T.N.O, Utrecht, the Netherlands), 76 (1957) *RECUEIL* 827.

Joris, Serge J., et al. "On the Monobasic or Dibasic Character of Dithiocarbamic Acids," Department of Chemistry, Carleton University, Ottawa 1, Ontario, *Analytical Chemistry*, vol. 41, No. 11, Sep. 1969.

Maeda, Bruce T., et al., "Treating Wastes Generated by Copper Electroplating Tools," *MICRO*, Sep. 1999, p.39–49.

Mendicino, Laura, et al., "The Environment, Health and Safety Side of Copper Metalization," *Semiconductor International*, Jun. 1998, pp. 105–106, 108 and 110.

Miertuš, Stanislav, et al., "Theoretical Study of the Elctron Structure and Properties of Dithicarbamates and Their Complexes With Transition Metals," [a] Department of Analytical Chemistry, Slovak Technical University, 812.37 and [b] Cancer Research Institute, Slovak Academy of Science, 812.32 Bratislava, *Collection Czechoslovak Chem. Commun.* [vol. 49] 1984.

Scharfe, R. R., et al., "Stability of Metal Dithiocarbamate Complexes," Department of Chemistry, Carleton University, Ottawa, Ontario K1S 5B6, Canada.

Tetsumi, T., et al., "Direct Reaction of Metal Powders With Several Sodium Dithiocarbamates," Department of Pharmaceutical Sciences, Setsunan University, Nagao Toge–cho, Hirakata–shi, Osaka 5730–01, Japan.

Tetsumi, T., et al., "Reaction of Copper Powder With Tetraalkylthiuram Disulphides," Department of Pharmaceuticals Sciences, Setsunan University, Nagao Tohge–cho, Hirakara–shi, Osaka 573–01, Japan.

Treasure, Tony, "The EMEW Cell" Engineered and Ready to Take on New Markets, Randol Copper Hydrometallurgy Forum, Vancouver, 1998, pp. 1–25.

Wasay, S. A., et al., "Removal of Trace Heavy Metals by Metal Chelates," *Intern J. Environmental Studies*, 1990, vol. 36., pp. 191–197.

Won, C.W., et al., "Recovery of Copper from =Etchant Solution by Electrowinning and Cementation," *Metallurgical Transactions*, vol. 24B, Feb. 1993, pp. 192–197.

* cited by examiner

PROCESS FOR TREATING WASTE WATER CONTAINING COPPER

STATEMENT REGARDING FEDERALLY-SPONSORED RESEARCH OR DEVELOPMENT

Not applicable.

CROSS REFERENCE TO RELATED APPLICATIONS

Not applicable.

BACKGROUND OF THE INVENTION

The present invention relates in general to a process for treating aqueous waste. More particularly, this process involves treating a copper waste stream resulting from chemical mechanical planarization (CMP).

Chemical mechanical planarization (CMP) is a new method of applying copper to semiconductors. In fact, using copper to make semiconductors is new to the industry. CMP is a process used by the semiconductor industry to produce very smooth surfaces on each layer of a microchip by "sanding" the microchip with a water slurry of silica or alumina. In making microchips for computers, pagers, phones and other electronic equipment, a large volume of purified water is used for the dilution and rinsing steps of the CMP process. When copper layers are planarized, the waste water from the process contains relatively large amounts of dissolved copper.

Currently, because CMP is a new process, copper waste is merely drummed and shipped off. Similar wastewater created in other industries, such as the plating industry or the printed circuit board industry, generally is treated in an electrowinning process to remove copper. The disadvantage with such a process is that, because particles suspended in the copper CMP waste water are not removed before the electrowinning process, the separated copper is impure. Another disadvantage with electrowinning the copper CMP waste water is that the concentration of copper may be too low for effective electrowinning.

Other methods for removing metals from waste water include precipitation of the metals as their oxides, as is well known in the art. The precipitated metals are removed from the water by filtration methods such as bag filtration, ultrafiltration or microfiltration. However, such methods suffer from the shortcomings that they can produce a hazardous sludge, which has no value, and that some metals are not precipitated and therefore remain in solution. In fact, disposing of hazardous sludge costs more than disposing of typical sludge due to its hazardous nature.

Further methods of removing metals from waste water include using solids de-watering devices such as filter presses, belt presses, or centrifuges to concentrate the solids. However, solids are difficult to remove from these devices, and the operation of these devices is labor intensive. While solids de-watering devices exist which operate automatically and discharge solids automatically, these devices are too expensive to be viable options for many.

Thus, a process for treating waste water containing copper CMP particles is needed which can overcome the above disadvantages. Specifically, a process is needed that will remove copper from the solids and liquids in the waste water without the use of a solids de-watering device. Furthermore, a process which does not produce a hazardous sludge is desired. In addition, a process which recovers the copper in a form which has value, such as metallic copper, would be preferred.

SUMMARY OF THE INVENTION

It is an object of the present invention to provide a process and system for treating waste water containing copper CMP particles that allows basically pure copper to be recovered from the waste water.

Another object of the present invention is to provide a process and system for treating waste water that is able to remove most if not all of the copper from the waste water without the use of a solids de-watering device.

According to the present invention, the foregoing and other objects may be achieved by a process for treating copper CMP waste water. This process involves adjusting the pH of the waste water to between about 3 and 4, adding a coagulant or flocculating polymer to the waste water to generate larger particles, feeding the treated waste water to a concentration tank, filtering the waste water from the concentration tank through an ultrafiltration or a microfiltration membrane to produce a permeate and solids, recycling the solids to the concentration tank, feeding the permeate through a carbon bed to remove total organic carbon, and feeding the carbon bed effluent through an ion exchange column to remove soluble copper. This process further may include washing sludge collected in the concentration tank with the treated stream that exits the ion exchange column. Another aspect of the present invention is a system for performing the process described above.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

In the accompanying drawing, which forms apart of the specification and is to be read in conjunction therewith.

DETAILED DESCRIPTION OF THE PREFERRED EMBODIMENT

Figure 1:
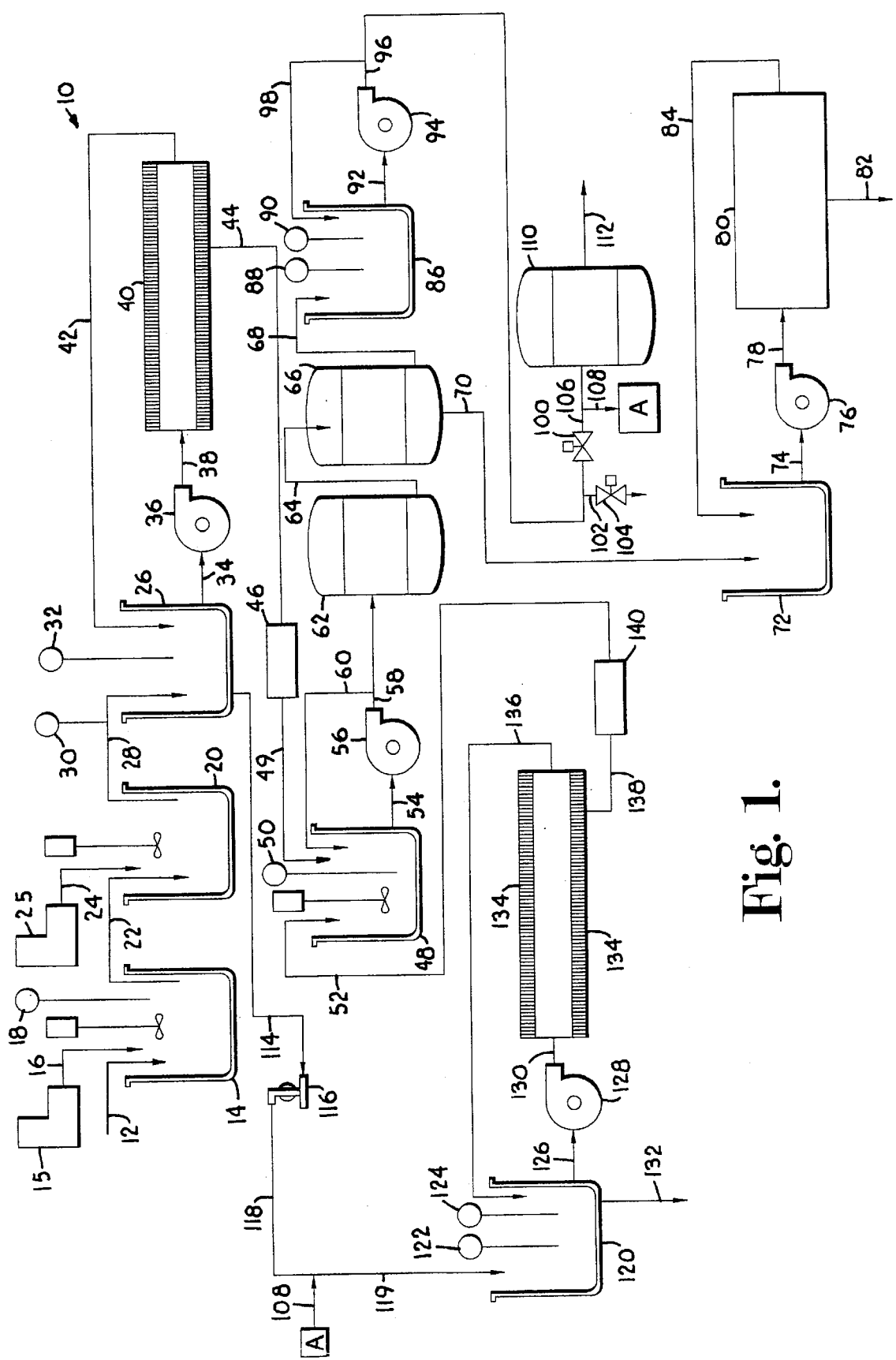
FIG. 1 is a schematic representation of the preferred embodiment of the waste water treatment system of the present invention, which is used for treating copper CMP waste water.

This process generally relates to treating the waste water created in making semiconductors with copper. More specifically, there is a copper plating step, when making semiconductors, where copper metal is deposited onto a wafer. Following this, there is a CMP step, which involves making a smooth surface on a layer of a semiconductor chip before depositing the next layer onto the wafer. The CMP process generally involves using a slurry of either alumina and/or silica particles in water for grinding out and polishing the surface. The polishing step produces a relatively concentrated waste stream of CMP particles. After the polishing step, the surface is rinsed to remove excess copper and alumina particles and/or silica particles on the surface. The polishing stream and the rinse stream form a copper CMP stream that is treated by the process and system of the present invention.

The system of the present invention may include multiple treatment tanks for the waste water, areas for ultrafiltration or microfiltration and concentration, and an ion exchange chamber for removing soluble copper from the waste water before disposing it. These components of the system and other features will now be described in greater detail. Referring to FIG. 1, one embodiment of the system of the present invention is a continuous system and is broadly designated by reference numeral 10. A copper CMP waste water stream is fed through line 12 and into tank 14. Pump 15 feeds either an acid or a base to tank 14 through line 16 to adjust the pH of the waste water. The pH of the waste water in tank 14 is monitored with pH control 18. The pH adjusted waste water in tank 14 is then fed to tank 20 via line 22. A coagulant or flocculating polymer is also pumped into tank 20 through line 24 via pump 25. The treated waste water in tank 20 is then fed to concentration tank 26 via line 28. The copper content of the treated waste water in line 28 is measured by copper concentration meter 30. The level of treated waste water in concentration tank 26 is monitored by level control 32.

Treated waste water exits concentration tank 26 through line 34 and is pumped through pump 36 into line 38. Line 38 feeds the treated waste water into microfiltration skid 40. The filtered solids from microfiltration skid 40 are recycled through line 42 back to concentration tank 26. The permeate exits the microfiltration skid 40 via line 44. It is fed to turbidity meter 46 by line 44, and then it exits the turbidity meter and is fed into permeate tank 48 via line 49. The level of permeate tank 48 is monitored by level control 50. Permeate tank 48 also receives permeate from line 52, discussed infra. The permeate exits permeate tank 48 in line 54 and is pumped through pump 56 to line 58. Line 60 splits off of line 58 and carries permeate that is recycled to permeate tank 48. The rest of the permeate continues through line 58 to carbon bed 62. The treated permeate exits carbon bed 62 through line 64 and is carried to ion exchange column 66. A treated stream that contains little or no copper exits ion exchange column 66 in line 68.

Periodically, ion exchange column 66, which contains an ion exchange resin, is taken off-line to treat the ion exchange resin when it becomes too concentrated with copper. This copper concentrated ion exchange resin is treated with a regeneration stream to remove copper from the resin. The copper concentrated regeneration stream exits ion exchange column 66 through line 70 and is fed into electrowinning tank 72. This stream then exits electrowinning tank 72 through line 74 and is pumped by pump 76 to line 78. Line 78 feeds the stream to electrowinning unit 80. The metallic copper exiting electrowinning chamber 80 is represented by line 82. Some of the solution in electrowinning chamber 80 exits the chamber (not shown), and some of the solution is recycled to tank 72 via line 84.

When ion exchange column 66 is on-line, the treated stream exiting ion exchange column 66 in line 68 is fed to clean tank 86. Copper content meter 88 measures the amount of copper in the stream. Level control 90 monitors the level of the treated stream in the tank. The treated stream in clean tank 86 exits through line 92 and is fed through pump 94 into line 96. Line 98 splits off of line 96 and recycles some solution to clean tank 86. The remaining solution in line 96 either continues to flow in line 96 until it reaches valve 100, or when valve 100 is closed, it is diverted to line 102 which is connected to valve 104. The treated stream is diverted through valve 104 and sent back to permeate tank 48 when the copper content of the stream is too high. If the copper content is acceptable, the stream flows through valve 100 into line 106. Line 108 splits off of line 106 and carries some of the treated stream, designated by the letter A. The rest of the treated stream continues through line 106 to chelating resin safeguard 110. The stream exits chelating resin safeguard 110 through line 112 and is safe for disposal.

In addition to treated waste water exiting concentration tank 26 through line 34, sludge that settles to the bottom of the treated waste water exits concentration tank 26 through line 114. It is pumped by pump 116 to line 118. A treated stream in line 108, which is designated by the letter A and is received from line 106, is added to line 118, and this treated stream is then carried with the sludge in line 119 to concentration tank 120. The copper content of the solution in tank 120 is measured by copper content meter 122. The level of solution in tank 120 is monitored by level control 124. Solution exits concentration tank 120 through line 126 and is pumped through pump 128 into line 130. Sludge, which settles to the bottom of the solution in concentration tank 120, exits concentration tank 120 through line 132. Line 130 feeds the solution into microfiltration skid 134. The filtered solids from microfiltration skid 134 are recycled through line 136 back to concentration tank 120. The permeate from microfiltration skid 134 exits via line 138 and then is fed through turbidy meter 140. It exits turbidy meter 140 into line 52, which is fed into permeate tank 48, as discussed above.

The system described above is used to perform a waste water treatment process, which is another aspect to the present invention. This process involves treating copper CMP waste water, which is carried in line 12 into tank 14.

The copper content of the copper CMP stream to be treated in the process of the present invention is preferably less than about 1000 ppm. More preferably, the copper content of the stream is less than about 500 ppm. Most preferably, the copper content of the stream is less than about 150 ppm. The solids content of the stream should be less than about 30,000 ppm total suspended solids (TSS). Preferably, the solids content is less than about 10,000 ppm TSS; more preferably, less than 5,000 ppm TSS; and most preferably, it is less than about 1,000 ppm TSS. The temperature of the copper CMP stream is between about 10 and 50° C. Preferably, it is between about 15 and 40° C., and most preferably, it is between about 20 and 30° C. The hydrogen peroxide content of the stream is less than about 5%; preferably, it is less than about 3%; more preferably, it is less than about 1%; and most preferably, it is less than about 0.1%. Preferably, the ethylenediamine tetraacetic acid (EDTA) content of the stream is about 0% to prevent problems in the ionic exchange column.

The pH of the copper CMP stream is adjusted to below about 6 by adding either an acid or base as needed. Preferably, the pH is adjusted to between about 3 and 4. Preferably, if an acid is added, sulfuric acid is used, and preferably, if a base is added, sodium hydroxide is used. When metallic copper is present in the stream, preferably an oxidant such as hydrogen peroxide or air is added to the copper CMP waste water to convert the copper to ionic copper so that it will not be trapped in the solids during filtration. The addition of an oxidant can also take place in tank 14. Preferably, the reaction time for converting the metallic copper to ionic copper is less than about two hours. More preferably, the reaction time is less than about one hour. In the most preferred embodiment of this invention, the reaction time is less than about 30 minutes.

The pH adjusted mixture is carried to a second tank 20 via line 22 where a coagulant and/or flocculating polymer is added. By adding a coagulant and/or flocculating polymer, larger particles are generated so that filtration is easier. This increases the productivity of the membranes in the microfiltration skid. Preferably, KSP 340, a co-polymer of dimethylamine, ethylenediamine, and epichlorohydrin that may be obtained from Koch Microelectronic Service Company, Inc., 20 East Greenway Plaza, Houston, Tex. 77046-2002, is used as a coagulant, and preferably, KSP 10E, a co-polymer of acrylamide and sodium acrylate that may also be obtained from Koch Microelectronic Service Company, Inc. is used as a flocculating polymer. If KSP 340 is used, it is used in a concentration of about 10 ppm in the waste water, which equates to a silica to KSP 340 ratio of about 20,000 to 1. With some CMP streams, coagulants and flocculating polymers will not be needed. An example of such a stream is an alumina-based slurry. Typically, a coagulant is added to a silica-based slurry. Flocculating polymers are usually added in situations where it is difficult to generate particles of a sufficient size by just using a coagulant. When both a coagulant and a flocculent are needed, the coagulant may be added in the second reaction tank 20 and the flocculent may be added in a third reaction tank (not shown), which may be a small reaction tank so as to conserve space. Typically, the majority of particles formed during the process of the present invention have an equivalent diameter of between about 1.95 and 3.9 microns.

When an ultrafiltration membrane is used, coagulants and flocculants are not generally needed. The pore sites of ultrafiltration membranes are generally ≦0.1 micron.

The treated CMP waste water is then pumped into a concentration tank 26, which serves as a feed tank for the microfiltration skid 40. The contents of concentration tank 26 are pumped through the microfiltration skid 40 to separate the treated waste water into a permeate and solids. Typically, the waste water is fed through the microfiltration skid at less than about 150 gallons per square foot of membrane area per day (gfd) and usually about 60 gfd. Preferably, a microfiltration skid that contains a plurality of membranes is used. For some membrane types, the lifetime of the membrane is reduced by exposure to hydrogen peroxide. In such cases, a reductant such as sodium hydrosulfide or sodium metabisulfite (SBS) is added to tank 20 to remove the hydrogen peroxide from the waste water by chemical reduction before it is fed to the membrane. Preferably, SBS is used. The permeate or filtrate from the microfiltration membrane flows to or is pumped into a permeate tank 48. Optionally, the microfiltration filtrate can be pumped directly to a carbon bed (not shown) rather than traveling through the permeate tank first. The reject, which is a solids-containing stream, flows back to concentration tank 26. Alternatively, an ultrafiltration unit may be used in place of the microfiltration skid.

The microfiltration permeate, either from permeate tank 48 or directly from the microfiltration skid 40, is then pumped through a carbon bed 62. The carbon bed 62 removes total organic carbon (TOC) and decomposes hydrogen peroxide. Thus, organic carbon impurities are removed. Hydrogen peroxide, if allowed to pass through ion exchange column 66 and mix with the ion exchange resin, destroys the active sites of the resin, quickly reducing its capacity. Thus, although treatment through carbon bed 62 is optional, it is a preferable step of the process of the present invention.

The carbon bed effluent is pumped through ion exchange column 66 to reduce the soluble copper content of the effluent. The ion exchange column 66 contains a copper chelating ion exchange resin, which preferably operates at a pH between about 2 and 6, and more preferably, it operates at a pH between about 3 and 4. Preferably, the copper chelating ion exchange resin is in the hydrogen form, meaning it contains hydrogen cations. Examples of such resins are IRC 718 from Rohm and Haas Corp. of Philadelphia, Pa., and TP 207 from Bayer Corp. of Pittsburgh, Pa. The effluent from the ion exchange column may contain less than about 5 ppm copper. Preferably, it contains less than about 1 ppm copper, and most preferably, it contains less than about 0.1 ppm copper.

When the resin in the ion exchange column 66 is fully loaded with copper and not able to recover more copper from the treated stream, the column is regenerated. In regeneration, the column is taken off-line, and a regeneration stream, such as a dilute solution of hydrochloric or sulfuric acid, is passed through the column, usually in a countercurrent direction from the direction in which the treated stream flows through the column. The first few bed volumes of regeneration solution exiting column 66 contain high concentrations of copper, more than 500 ppm. In most cases, these first few bed volumes contain more than 1000 ppm of copper, and in many cases, they may contain more than 5000 ppm of copper. These concentrated regeneration streams should be directed to electrowinning tank 72 via line 70 and then pumped by pump 76 to electrowinning chamber 80, where metallic copper is generated from the copper in the regeneration stream. The next few bed volumes of regeneration solution, which contain more dilute concentrations of copper, may also be sent to electrowinning chamber 80 or they may be sent to tank 14 to be treated with the copper CMP waste water entering the process of the present invention.

The effluent from the ion exchange column 66 is carried to a clean tank 86 via line 68. The copper content of this effluent is measured by meter 88. If the copper content of the effluent is too high for disposal, valve 100 closes and the effluent is fed through valve 104 and added to permeate tank 48 for retreatment. If the copper content is low enough to meet disposal requirements, valve 104 is closed, and the effluent is sent through valve 100 and into chelating resin safeguard 110, which is a second ion exchange column. Chelating resin safeguard 110 uses the same resin and functions in the same way as column 66. The resin used in safeguard 110 is regenerated in the same manner as the resin in column 66 is regenerated. The treated stream exiting line 112 is safe for disposal.

After solids from the microfiltration skid 40 are sent back to concentration tank 26, the waste water in concentration tank 26 becomes more concentrated with solids and sludge begins to settle at the bottom of the tank. Sludge at the bottom of concentration tank 26 is pumped by pump 116 into a second concentration tank 120 by lines 114, 118, and 119. A treated stream from the ion exchange column is added to the sludge via line 108. The solution in tank 120 is pumped through microfiltration skid 134 to separate the solution into a second permeate and a second solids. The second permeate is fed to permeate tank 48 to be further treated with the permeate from microfiltration skid 40, if the turbidity reading from turbidity meter 140 is acceptable. The second solids is recycled to concentration tank 120. Within each washing cycle, the solids concentration of tank 120 increases and the copper content decreases. A second sludge settles to the bottom of tank 120. After about 8 washing cycles, sufficient copper has been removed from the sludge that it is safe for disposal. Sludge is discharged from concentration tank 120 through line 132.

In an alternate embodiment of the present invention, the system is a batch process rather than a continuous process. In this embodiment, the system includes similar apparatus to the continuous system shown in FIG. 1, except the second concentration tank 120, the second microfiltration skid 134, and the lines connecting these pieces of apparatus to the system are not part of this batch system.

The batch process of the present invention involves treating copper CMP waste water which is carried in line 12 into tank 14. Its pH is adjusted as done in the continuous process. An oxidant may also be added as described in the continuous process. The pH adjusted mixture is then carried to a second tank 20 via line 22 where a coagulant and/or flocculating polymer is added, as described in the continuous process. The treated waste water is then pumped into a concentration tank 26, which serves as a feed tank for the microfiltration skid. The contents of the concentration tank 26 are pumped through the microfiltration skid 40. The permeate from the microfiltration skid is fed to a permeate tank 48. The reject, which is a solids-containing stream that is not filtered, flows back into concentration tank 26. The permeate is then pumped from permeate tank 48 to carbon bed 62. The carbon bed effluent is pumped through an ion exchange column 66 to reduce the soluble content of the effluent. Following this, the ion exchange effluent is pumped through a chelating resin safeguard 110. The batch process is the same as the continuous process from when the permeate enters the permeate tank through when the treated stream exits the chelating resin safeguard.

In the batch process, when the solids content of concentration tank 26 reaches between about 2.5 and 5.0%, the influx of fresh copper CMP waste water via line 28 is stopped. The treated stream, which is designated by letter A, is fed into concentration tank 26. The solution in tank 26 is pumped through microfiltration skid 40 to separate the solution into a second permeate and a second solids. The second permeate is fed to permeate tank 48 to be further treated with the permeate from the first stage of the batch process, if the turbidity reading from turbidity meter 46 is acceptable. Second solids is recycled to concentration tank 26. Within each washing cycle, the solids concentration of tank 26 increases and the copper content decreases. A second sludge settles to the bottom of tank 120. After about 8 washing cycles, sufficient copper has been removed from the second sludge that it is safe for disposal. Second sludge is discharged through the bottom of concentration tank 26 in line 114.

The process and system of the present invention is able to remove copper from the solids and liquid in the copper CMP stream without the use of a solids de-watering device such as a filter press, a belt press, or a centrifuge. The process of the present invention is able to obtain copper concentrations of below 0.4 ppm for the stream exiting in line 112. Still further, after about 8 washing cycles, the sludge exiting in line 132, if a continuous process, or exiting in line 114, if a batch process, has a concentration of below about 1.5 ppm. Overall, the process of the present invention is able to remove about 90% of the copper from the copper CMP waste water. Preferably, this process is able to remove about 95% of the copper from the waste water, and most preferably, this process is able to remove more than about 99% of the copper from the waste water. As shown in the examples, the process of the present invention is also able to remove silica and/or alumina particles.

The following are examples of the process of the present invention. These examples are not meant in any way to limit the scope of this invention.

Example 1

In a batch operation, copper CMP waste water containing about 12 ppm copper was adjusted to a pH of 3 using 10% sulfuric acid. Over 20 gallons of the pH adjusted waste water were passed through a bench-top ultrafilter with a 0.1 micron pore size. The ultrafiltration was continued until about 500 mL remained in the concentration tank. Solids from the ultrafiltration were returned to the concentration tank, making a sludge with the liquid in the tank. Sludge remained in the concentration tank for rinsing with the ion exchange effluent, discussed infra.

The ultrafiltration permeate was passed through an ion exchange column with a bed volume of 25 mL. This ion exchange column contained a chelating ion exchange resin (IRC 718). Over 1,200 bed volumes were passed through the column. The resulting copper content of the effluent exiting the ion exchange column was generally less than 0.1 ppm. A portion of the ion exchange effluent was poured into the concentration tank, and the ultrafiltration was started again in order to rinse copper from the sludge in the concentration tank. Four liters were passed through the ultrafilter, and the liquid level in the concentration tank was reduced to about 500 mL. Another four liters of solution from the concentration tank were passed through the ultrafilter. The solids were then removed from the concentration tank and filtered using a Buchner Funnel fitted with a 0.45 micron filter. The solids were analyzed for copper content. They contained 25 ppm total solids and 0.83 ppm extractable copper, which are both considerably below regulatory limits.

Examples 2–5 show the composition of streams during the first stage of treating a copper CMP stream according to the process of the present invention using a microfilter with a pore size of 0.2 microns. Metal concentrations are shown in their elemental forms rather than as metal complexes. Total metals include dissolved metals and metals in solid form. Total Dissolved Solids (TDS) and Total Suspended Solids (TSS) are also shown.

Example 2

| Sample Taken | Dissolved Metals - ppm | | | | Total Metals - ppm | | | | pH | TDS ppm | TSS ppm | Total Solids ppm | % |
| --- | --- | --- | --- | --- | --- | --- | --- | --- | --- | --- | --- | --- | --- |
|  | Al | Cu | Fe | Si | Al | Cu | Fe | SI |  |  |  |  |  |
| Stream in line 12 | 0.68 | 426 | 0.05 | 3.70 | 85.9 | 502 | 0.17 | 168 | 5.05 | 1,840 | 469 |  |  |
| Solution in concentration tank 26 | 2.31 | 471 | 0.20 | 3.70 | 560 | 503 | 1.31 | 1,810 | 3.70 |  | 4,980 | 7,020 |  |
| Stream in line 44 | 0.69 | 470 | 0.11 | 2.70 |  | 493 |  |  | 3.55 | 1,740 | ND |  |  |
| Stream in line 68 | 1.35 | 4.62 | 0.12 | 2.90 |  | 3.5 |  |  | 2.17 | 853 |  |  |  |
| Stream in line 12* | 0.50 | 472 | 0.05 | 3.30 | 87.4 | 508 | 0.17 | 170 | 5.00 | 1,810 | 458 |  |  |

-continued

| Sample Taken | Dissolved Metals - ppm | | | | Total Metals - ppm | | | | pH | TDS ppm | TSS ppm | Total Solids ppm | % |
|---|---|---|---|---|---|---|---|---|---|---|---|---|---|
| | Al | Cu | Fe | Si | Al | Cu | Fe | SI | | | | | |
| Solution in concentration tank 26* | 2.35 | 458 | 0.15 | 3.80 | 736 | 476 | 1.54 | 1,890 | 3.72 | | 5,770 | 7,420 | |
| Stream in line 44* | 0.66 | 481 | 0.09 | 2.80 | | 490 | 3.57 | 1,750 | ND | | | | |
| Stream in line 68* | 0.60 | 35.7 | 0.10 | 2.80 | | 35.4 | 2.21 | 1,020 | | | | | |

*These samples weae taken 1 hour after the unstarred samples were taken.

Example 3

| Sample Taken | Dissolved Metals - ppm | | | | Total Metals - ppm | | | | pH | TDS ppm | TSS ppm | Total Solids ppm | % |
|---|---|---|---|---|---|---|---|---|---|---|---|---|---|
| | Al | Cu | Fe | Si | Al | Cu | Fe | Si | | | | | |
| Stream in line 12 | 0.30 | 62.5 | ND | 31.9 | 117 | 134 | 0.70 | 12,800 | 6.40 | 27,700 | 4,760 | | |
| Solution in concentration tank 26 | 3.40 | 86.1 | 1.0 | 45.6 | 495 | 228 | 3.20 | 37,800 | 3.14 | | 74,000 | 86,800 | |
| Stream in line 44 | 1.00 | 85.6 | 0.9 | 44.6 | | 91.2 | | | 3.09 | 7,850 | 34 | | |
| Stream in line 68 | 11.70 | 1.1 | 0.6 | 38.8 | | 1.12 | | | 2.48 | 6,020 | | | |
| Stream in line 12* | 0.7 | 69.1 | ND | 37.8 | 106 | 133 | 0.70 | 11,000 | 6.37 | 19,800 | 8,630 | | |
| Solution in concentration tank 26* | 2.8 | 83.6 | 0.4 | 47.4 | 289 | 209 | 1.70 | 28,300 | 3.12 | | 51,300 | 67,200 | |
| Stream in line 44* | 1.1 | 85.3 | 0.4 | 49.7 | | 80.9 | | | 3.11 | 8,050 | 15 | | |
| Stream in line 68* | 9.6 | 1.2 | 0.6 | 47.4 | | 1.16 | | | 2.85 | 8,520 | | | |
| Sludge in line 114 | | | | | | | | | | | | | 85.8 |

*These samples were taken 30 minutes after the unstarred samples were taken.

Example 4

| Sample Taken | Dissolved Metals - ppm | | | | Total Metals - ppm | | | | pH | TDS ppm | TSS ppm | Total Solids ppm | % |
|---|---|---|---|---|---|---|---|---|---|---|---|---|---|
| | Al | Cu | Fe | Si | Al | Cu | Fe | Si | | | | | |
| Stream in line 12 | 25.0 | 22.1 | 0.1 | 3.1 | 4,880 | 62.6 | 0.3 | 149 | 5.77 | 2,760 | 11,100 | | |
| Solution in concentration tank 26 | 53.9 | 58.2 | 0.2 | 4.2 | 21,900 | 90.9 | 1.7 | 1,870 | 3.53 | | 64,200 | 72,500 | |
| Stream in line 44 | 37.7 | 54.9 | 0.3 | 3.7 | | 64.0 | | | 3.49 | 4,870 | ND | | |
| Stream in line 68 | 17.2 | 0.18 | 0.7 | 9.6 | | 0.20 | | | 3.25 | 4,520 | | | |
| Stream in line 12* | 25.4 | 22.4 | 0.1 | 2.8 | 5,500 | 69.9 | 0.3 | 140 | 5.78 | 2,240 | 10,900 | | |
| Solution in concentration tank 26* | 63.0 | 61.5 | 0.2 | 3.7 | 31,200 | 93.6 | 1.8 | 1,680 | 3.53 | | 65,500 | 52,400 | |

-continued

| Sample | Dissolved Metals - ppm | | | | Total Metals - ppm | | | | pH | TDS ppm | TSS ppm | Total Solids | |
|---|---|---|---|---|---|---|---|---|---|---|---|---|---|
| Taken | Al | Cu | Fe | Si | Al | Cu | Fe | Si | | | | ppm | % |
| Stream in line 44* | 39.0 | 58.4 | 0.2 | 3.2 | | 57.8 | | | 3.47 | 5,040 | 40 | | |
| Stream in line 68* | 25.4 | 1.39 | 1.1 | 3.8 | | 1.45 | | | 3.43 | 4,680 | | | |

*These samples were taken 30 minutes after the unstarred samples were taken.

Example 5

| Sample | Dissolved Metals - ppm | | | | Total Metals - ppm | | | | pH | TDS ppm | TSS ppm | Total Solids | |
|---|---|---|---|---|---|---|---|---|---|---|---|---|---|
| Taken | Al | Cu | Fe | Si | Al | Cu | Fe | Si | | | | ppm | % |
| Steam in line 12 | 35.3 | 28.3 | ND | 2.6 | 9,340 | 139 | 0.7 | 243 | 5.62 | 3,800 | 19,900 | | |
| Solution in concentration tank 26 | 57.3 | 109 | 0.1 | 3.0 | 20,400 | 166 | 1.7 | 676 | 3.97 | | 43,500 | 52,500 | |
| Stream in line 44 | 47.6 | 112 | 0.1 | 2.9 | | 108 | | | 3.94 | 6,060 | 16 | | |
| Stream in line 68 | 4.1 | ND | ND | 2.5 | | 0.08 | | | 3.87 | 4,230 | | | |
| Stream in line 12* | 35.4 | 28.7 | ND | 2.7 | 11,100 | 166 | 0.9 | 263 | 5.62 | 6,900 | 15,500 | | |
| Solution in concentration tank 26* | 59.9 | 113 | 0.1 | 2.9 | 35,500 | 209 | 2.9 | 870 | 3.99 | | 68,600 | 82,600 | |
| Stream in line 44* | 48.0 | 117 | 0.1 | 3.1 | | 112 | | | 3.94 | 6,720 | 9 | | |
| Stream in line 68* | 19.6 | ND | ND | 3.1 | | 0.04 | | | 3.81 | 6,010 | | | |

*These samples were taken 1 hour after the unstarred samples were taken.

Examples 6–8 show the composition of the concentration tank during the second stage of treating a copper CMP stream according to the process of the present invention. More specifically, these examples show the initial composition of the concentration tank and its composition after each of 11 wash cycles. Each sample was taken when the concentration tank was about 45% full. A treated stream from the ion exchange column was then added to the concentration tank until it was about 90% full. Once the solution from the concentration tank was processed through the microfiltration skid, the tank level dropped to about 45%. This completes a wash cycle and a sample was taken. The treated stream was added once again, and the wash cycle was repeated.

Example 6

| Wash Cycle | Dissolved Cu, ppm | Total Cu, ppm | % CU Removal Each Cycle | pH | TDS, ppm | TSS, ppm | Total Solids, ppm |
|---|---|---|---|---|---|---|---|
| 0 (initial composition) | 136.00 | 135.00 | | 2.94 | 3,730 | 1,080 | 4,890 |
| 1 (after 1st wash cycle) | 74.10 | 69.10 | 48.81% | 2.88 | | | |
| 2 | 36.50 | 33.90 | 50.94% | 2.96 | | | |
| 3 | 19.60 | 18.10 | 46.61% | 2.96 | | | |
| 4 | 10.40 | 9.17 | 49.34% | 2.98 | | | |
| 5 | 5.38 | 5.11 | 44.27% | 2.98 | | | |
| 6 | 2.79 | 2.67 | 47.75% | 2.98 | | | |
| 7 | 1.19 | 1.21 | 54.68% | 2.98 | | | |
| 8 | 0.75 | 0.74 | 38.84% | 2.99 | | | |
| 9 | 0.39 | 0.41 | 44.59% | 3.00 | | | |
| 10 | 0.24 | 0.26 | 36.59% | 3.00 | | | |
| 11 | 0.16 | 0.19 | 26.92% | 3.00 | 3,260 | 684 | 3,930 |

Example 7

| Wash Cycle | Dissolved Cu, ppm | Total Cu, ppm | % CU Removal Each Cycle | pH | TDS, ppm | TSS, ppm | Total Solids, ppm |
|---|---|---|---|---|---|---|---|
| 0 | 68.10 | 68.90 |  | 2.87 | 2,800 | 6.010 | 10,600 |
| 1 | 38.60 | 39.00 | 43.40% | 2.94 | | | |
| 2 | 20.80 | 19.60 | 49.74% | 2.95 | | | |
| 3 | 11.00 | 10.80 | 44.90% | 2.96 | | | |
| 4 | 5.48 | 5.51 | 48.98% | 2.96 | | | |
| 5 | 3.08 | 2.97 | 46.10% | 2.06 | | | |
| 6 | 1.76 | 1.60 | 46.13% | 2.97 | | | |
| 7 | 0.99 | 0.94 | 41.25% | 2.97 | | | |
| 8 | 0.55 | 0.59 | 37.23% | 2.98 | | | |
| 9 | 0.34 | 0.33 | 44.06% | 2.98 | | | |
| 10 | 0.21 | 0.21 | 36.36% | 2.99 | | | |
| 11 | 0.14 | 0.15 | 28.57% | 2.97 | 7,880 | 1,430 | 9,940 |

Example 8

| Wash Cycle | Dissolved Cu, ppm | Total Cu, ppm | % CU Removal Each Cycle | pH | TDS, ppm | TSS, ppm | Total Solids, ppm |
|---|---|---|---|---|---|---|---|
| 0 | 31.70 | 31.50 |  | 3.01 | 2,860 | 26.200 | 21,500 |
| 1 | 15.20 | 13.90 | 55.87% | 2.95 | | | |
| 2 | 4.47 | 7.22 | 48.06% | 2.91 | | | |
| 3 | 3.98 | 3.90 | 45.98% | 2.91 | | | |
| 4 | 1.80 | 2.11 | 45.90% | 2.96 | | | |
| 5 | 1.10 | 1.08 | 48.82% | 2.94 | | | |
| 6 | 0.62 | 0.66 | 38.89% | 2.93 | | | |
| 7 | 0.35 | 0.41 | 37.88% | 2.94 | | | |
| 8 | 0.22 | 0.23 | 43.90% | 2.95 | | | |
| 9 | 0.12 | 0.15 | 34.78% | 2.92 | | | |
| 10 | 0.08 | 0.12 | 20.00% | 2.91 | | | |
| 11 | 0.06 | 0.09 | 25.00% | 2.92 | 1,680 | 11,200 | 17,900 |

From the foregoing, it will be seen that this invention is one well adapted to attain all the ends and objects hereinabove set forth together with other advantages which are obvious and inherent to the process. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

We claim:

1. A process for treating waste water containing copper and other particles from a chemical mechanical planarization (CMP) process, comprising:
   adjusting the pH of said waste water to between about 3 and 4;
   filtering said waste water through a membrane to separate said waste water into a first permeate and first solids;
   feeding said first permeate through an ion exchange column to remove copper from said first permeate;
   feeding said pH adjusted waste water to a first concentration tank before said filtering step;
   recycling said first solids from said filtering step to said first concentration tank, wherein a first sludge settles to the bottom of said first concentration tank;
   stopping the feed of said pH adjusted waste water to said first concentration tank;
   washing said first sludge with a treated stream from said ion exchange column in said first concentration tank;
   feeding said washed first sludge to said membrane to separate said washed sludge into a second permeate and second solids;
   recycling said second solids to said first concentration tank, wherein a second sludge settles to the bottom of said first concentration tank; and
   feeding said second permeate to said ion exchange column with said first permeate, wherein said process is a batch process.

2. The process of claim 1, wherein said second sludge contains less than about 1.5 ppm copper after repeating the washing step about 8 times.

3. A process for treating waste water containing copper and other particles from a chemical mechanical planarization (CMP) process, comprising:
   adjusting the pH of said waste water to between about 3 and 4;
   filtering said waste water through a membrane to separate said waste water into a first permeate and first solids;
   feeding said first permeate through an ion exchange column to remove copper from said first permeate;
   feeding said pH adjusted waste water to a first concentration tank before said filtering step;
   recycling said first solids from said filtering step to said first concentration tank, wherein a first sludge settles to the bottom of said first concentration tank;
   feeding said first sludge to a second concentration tank;
   washing said first sludge with a treated stream exiting said ion exchange column in said second concentration tank to form a slurry, wherein a second sludge settles to the bottom of said second concentration tank;

feeding said slurry through a second filtration unit to separate said slurry into a second permeate and second solids; and feeding said second permeate along with said first permeate to said ion exchange column to remove copper from said first and second permeates, wherein said process is a continuous process.

4. The process of claim 3, wherein said second sludge has a concentration of less than about 1.5 ppm copper after repeating the washing step about 8 times.

5. A process for treating waste water containing copper and other particles from a chemical mechanical planarization (CMP) process, comprising:

adjusting the pH of said waste water to below about 6;

filtering said waste water through a membrane to separate said waste water into a first permeate and first solids;

feeding said first permeate through anion exchange column to remove copper from said first permeate, wherein said ion exchange column contains a copper chelating ion exchange resin that interacts with said first permeate to remove soluble copper from said first permeate;

feeding a regeneration stream through said ion exchange column to remove copper from said resin; and feeding said regeneration stream to an electrowinning unit to recover metallic copper from said regeneration stream.

* * * * *